US005790213A

United States Patent [19]
Sasaki et al.

[11] Patent Number: 5,790,213
[45] Date of Patent: Aug. 4, 1998

[54] IMAGE DISPLAY DEVICE HAVING ADJACENT PIXEL OVERLAPPING CIRCUIT ELEMENTS

[75] Inventors: Osamu Sasaki; Ichiro Shiraki; Manabu Matsuura, all of Tenri; Hiroshi Yoneda, Ikoma, all of Japan

[73] Assignee: Sharp Kabushiki Kaisha, Osaka, Japan

[21] Appl. No.: 523,606

[22] Filed: Sep. 5, 1995

[30] Foreign Application Priority Data

Sep. 8, 1994 [JP] Japan ................................. 6-214782

[51] Int. Cl.⁶ ................................................. G02F 1/136
[52] U.S. Cl. ................................................. 349/48
[58] Field of Search ............................ 359/58, 59, 60, 359/54, 55, 57; 349/48

[56] References Cited

U.S. PATENT DOCUMENTS

| | | | |
|---|---|---|---|
| 4,239,346 | 12/1980 | Lloyd | ............ 350/350 |
| 4,432,610 | 2/1984 | Kobayashi et al. | |
| 4,471,347 | 9/1984 | Nakazawa et al. | |
| 4,532,506 | 7/1985 | Kitazima et al. | |
| 4,781,437 | 11/1988 | Shields et al. | |
| 4,870,396 | 9/1989 | Shields | |
| 5,111,195 | 5/1992 | Fukuoka et al. | |
| 5,165,075 | 11/1992 | Hiroki et al. | |
| 5,194,974 | 3/1993 | Hamada et al. | |
| 5,457,552 | 10/1995 | Ogurtsov et al. | ............ 349/54 |
| 5,473,451 | 12/1995 | Kazurov et al. | ............ 349/54 |
| 5,479,280 | 12/1995 | Kazurov et al. | ............ 349/42 |
| 5,515,187 | 5/1996 | Nakamura et al. | ............ 349/54 |

FOREIGN PATENT DOCUMENTS

| | | |
|---|---|---|
| 0079496 | 5/1983 | European Pat. Off. |
| 55-62480 | 10/1980 | Japan |
| 56-83781 | 8/1981 | Japan |
| 57-31159 | 2/1982 | Japan |
| 64-5282 | 1/1989 | Japan |
| 2-245741 | 10/1990 | Japan |
| 2-272521 | 11/1990 | Japan |
| 3-77915 | 4/1991 | Japan |
| 3-77922 | 4/1991 | Japan |
| 3-257427 | 11/1991 | Japan |
| 4-310925 | 11/1992 | Japan |
| 5-93922 | 4/1993 | Japan |

*Primary Examiner*—Anita Pellman Gross
*Assistant Examiner*—James A. Dudek
*Attorney, Agent, or Firm*—Nixon & Vanderhye P.C.

[57] ABSTRACT

A liquid crystal display device includes pixels, arranged in a two-dimensional matrix on a substrate, for displaying an image, and several types of transistors, fabricated monolithically on the substrate for driving the respective pixels. One transistor in each pixel is juxtaposed on a periphery section of an adjacent pixel. By sharing such sections between adjacent pixels the fabrication of the transistors is simplified with the area occupied by each transistor and the pixel size reduced.

20 Claims, 18 Drawing Sheets

IMAGE DISPLAY DEVICE HAVING ADJACENT PIXEL OVERLAPPING CIRCUIT ELEMENTS

FIELD OF THE INVENTION

The present invention relates to an image display device such as a liquid crystal display panel which displays an image based on image signals.

BACKGROUND OF THE INVENTION

In a conventional liquid crystal display panel as an image display device, pixels in the form of cells containing liquid crystals for displaying an image are arranged in a two-dimensional matrix on a transparent insulator substrate or semiconductor substrate. Signal lines and scanning lines for driving the pixels are arranged along the borderlines between the pixels.

Formed in each pixel is a transistor (composed mainly of one n-channel or p-channel MOS transistor element) as a switching element for transmitting or blocking image signals sent from the signal lines and the scanning lines. A pixel electrode is formed in the remaining area (non-transistor area) of each pixel. Namely, one pixel is formed by the transistor and the pixels electrode.

The structure of a pixel in a conventional liquid crystal display device is shown in FIGS. 15 and 16 (FIG. 15 showing an equivalent circuit, FIG. 16 being a schematic plan view thereof).

As illustrated in FIGS. 15 and 16, a pixel electrode 53a as one of the electrodes of a pixel 53 is connected to a signal line 52 through the source and drain of a switching element 51. A gate terminal of the switching element 51 is connected to a scanning line 54.

With this structure, for example, when the scanning line 54 is activated, the switching element 51 turns on. Then, pixel data of the signal line 52 is written on the pixel 53 through the switching element 51. Even when the scanning line 54 becomes non-active and when the switching element turns off, an electric field continues to be applied to liquid crystals in the pixel 53 by charges kept in the pixel 53, thereby maintaining a displayed image.

However, since a leakage resistance is present in the liquid crystals constituting the pixel 53, the charges accumulated in the pixel 53 leak out as a leakage current through the leakage resistance. As a result, the electric field in the liquid crystals in the ON state is decreased, causing deterioration of the display quality such as a lowering of the contrast and flicker in the pixels 53.

In order to solve such problems, it has been considered to form in each pixel 53 a CMOS, a source follower circuit, a sample-and-hold circuit, and a driving circuit for driving the pixel electrode 53a using a plurality of circuit elements such as transistors and capacitors so as to improve the quality of the displayed image.

Specifically, Document (1), Japanese Publication for Unexamined Patent Application No. 310925/1992 (Tokukaihei 4-310925) proposes to install a buffer amplifier in the driving circuit of the pixel 53. Document (1) will be explained in detail below with reference to FIG. 17.

The driving circuit of the pixel 53 is formed by a switching transistor 51, a capacitor 55 as a charge holding capacitor, and a buffer amplifier 56. Additionally, the scanning line 54 is connected to the gate of the switching transistor 51, and the signal line 52 is connected to the source thereof.

In this driving circuit, when the switching transistor 51 is turned on by the scanning line 54 to write a predetermined voltage to the capacitor 55, the capacitor 55 holds the voltage. Thereafter, the switching transistor 51 is turned off. At this time, since the input impedance of the buffer amplifier 56 has a high resistance, the charge held in the capacitor 55 is not reduced as a leakage current. It is thus possible to continue the supply of a current to the pixel 53 from a power source $V_{DD}$ of the buffer amplifier 56. Consequently, even when the leakage resistance of a liquid crystal is small, it is possible to hold a predetermined electric field with respect to the liquid crystal in the ON state.

Document (2), Japanese Patent Application No. 221774/1992 (Tokuganhei 4-221774) proposes a circuit which employs a CMOS structure for the buffer amplifier and is capable of holding positive and negative charges with respect to liquid crystal.

In recent years, in order to deal with high-definition televisions (HDTV), an image display device is desired to achieve an increased numerical aperture of a pixel, a reduction in the size of a pixel, and high-speed scanning.

As to high-speed scanning, if a transistor is fabricated by a material with a low mobility, for example, an amorphous silicon whose mobility is around 0.1 to 0.5 cm$^2$ V$^{-1}$S$^{-1}$, it is difficult to achieve high-speed scanning with a usual driving method. However, if the transistor is formed by a material with a high mobility such as polycrystalline silicon and mono-crystalline silicon, it is possible to perform high-speed scanning.

As to the numerical aperture of the pixel, Document (1), explained above, discloses means for increasing the numerical aperture by disposing a driving circuit of a pixel electrode below the pixel electrode (reflective electrode in Document 1).

If polycrystalline silicon or mono-crystalline silicon is used for the fabrication of transistors in the circuits of the documents (1) and (2), smaller transistors are formed at high speeds with reduced leakage, thereby achieving circuits which can reduce the pixel size.

Referring now to FIG. 18, the following description discusses the structure of an n-channel transistor using polycrystalline silicon to achieve high-speed scanning, and a method for fabricating the same.

First, a base coat (not shown) is formed by silicon dioxide (SiO$_2$) on a glass substrate 60. Next, an amorphous silicon film is deposited on the base coat by plasma CVD. Additionally, a non-doped polycrystalline silicon (hereinafter referred to as polysilicon) is formed by growing the amorphous silicon film in solid phase or crystallizing the amorphous silicon film with laser. Subsequently, a gate oxide film 61 is formed by thermal oxidation of the polysilicon.

Then, a gate electrode 62 is formed by aluminum (Al) on the gate oxide film 61. Next, n-type ions such as boron ions are implanted in predetermined positions and n$^+$ polysilicon is formed on each side of the gate electrode 62 so as to form a source 63 and a drain 64, respectively, in fabricating the n-channel transistor. When fabricating the p-channel transistor, p-type ions such as phosphorous ions are implanted in the same manner.

Thereafter, an anodic oxide film 65 is formed on the gate oxide film 61 and the gate electrode 62 by anodic oxidation. Then, a layer-to-layer insulating film 66 is formed, contact openings are formed in predetermined positions of the insulating film 66, and a source line 67 and a drain line 68 are formed by aluminum. Finally, one of the source line 67 and the drain line 68 is connected to a transparent conducting film (ITO) 69 functioning as a pixel electrode so as to fabricate the transistor of a pixel 70.

The method for forming the anodic oxide film 65 on the gate electrode 62 in the p-channel transistor and the n-channel transistor may be separately varied so as to optimize the channel resistance and the OFF-state current between the source 63 and the drain 64 as well as to increase the heat resistance of the gate electrode 62 formed by aluminum.

However, the following problems are still present. Namely, when external light is directly irradiated on a transistor formed by polycrystalline silicon, the transistor produces a light leakage current. The transistor also generates a leakage current with an electromagnetic wave. Similarly, the leakage current is produced when the mono-crystalline silicon is used.

As a result, the OFF-state current of the transistor is increased, and the charges accumulated in the pixel capacitor is immediately discharged as a leakage current, resulting in deteriorated display quality such as an insufficient contrast level and flicker of the displayed image.

Moreover, since the signal lines and power source lines are arranged below the reflective electrodes, capacitive coupling between the lines and the reflective electrodes occurs, causing crosstalk in the display potential.

In order to solve such problems, it has been proposed to reduce the light leakage current by forming reflective electrode to cover the switching element through an insulating layer for blocking the external light.

Specifically, Document (3), Japanese Publication for Unexamined Patent Application No. 62480/1980 (Tokukaisho 55-62480) proposes to draw a signal line and power source line from a diffusion layer of the transistor using polycrystalline silicon and covering the diffusion layer with a liquid crystal driving electrode made of aluminum through an insulating film.

Document (4), Japanese Publication for Unexamined Patent Application No. 83781/1981 (Tokukaisho 56-83781) proposes to form a reflective electrode on a driving circuit including a transistor and a capacitor as a unit pixel.

Document (5), Japanese Publication for Unexamined Patent Application No. 31159/1982 (Tokukaisho 57-31159) discloses a two-metal-layer structure in which a liquid crystal driving electrode is formed as a second metal layer through an insulating layer on a polycrystalline silicon layer connected to the diffusion layer of the transistor and a light blocking metal layer is formed as a first metal layer in the insulating layer.

Document (6), Japanese Publication for Unexamined Patent Application No. 245741/1990 (Tokukaihei 2-245741) discloses a structure including a first pixel electrode connected to a drain electrode, a second pixel electrode as a reflective electrode, and a signal line electrode covered with the first or second pixel electrode through an insulating layer, and proposes to make the dielectric constant of the insulating layer between the drain electrode and the first pixel electrode smaller than the dielectric constant of the insulating layer between the first and second pixel electrodes.

However, the following problems still remain in spite of the above-mentioned improvements.

The proposals made by Documents (3) and (4) are effective when only one transistor circuit is used. However, if a plurality of circuits are used as mentioned in Documents (1) and (2), there is a limit in covering the circuits with the liquid crystal driving electrode. Thus, there is a great possibility that the lines and the diffusion layer are exposed to the leakage light.

In particular, since Document (4) limits the reflective electrode as a unit pixel, leakage of light is significant. Moreover, since Document (4) discloses a technique for producing a flat reflective electrode by bonding a polyimide film as an organic insulating film on the driving circuit, it is basically different from the present invention.

Document (5) uses polycrystalline silicon for the first layer, and the basic process is a process of forming two metal layers. Consequently, the second metal layer is a liquid crystal driving electrode and the first metal layer is a light blocking layer. Then, the wiring forms a polycrystalline silicon layer. If the scale of the pixel driving circuit becomes larger, it is difficult to achieve such a structure.

Moreover, since the light blocking layer as the second layer of Document (5) is not connected to a line, it is potentially in a floating state and produces a small electromagnetic shielding effect by the light blocking layer. In the above-mentioned structure where the driving electrode of a pixel is formed to cover the signal lines and the scanning lines, the effect of preventing the influence of capacitive coupling from the lines is small.

The reasons for this is that since the light blocking layer is present in a floating state in each pixel electrode in the embodiment of Document (5), a leakage electric field from the driving circuit (including the wiring) of the pixel electrode directly varies the potential of the light blocking layer, and thus varies the potential of the liquid crystal driving electrode.

Needless to say, this document does not propose to achieve efficient wiring by forming N lines and the light blocking layer as the same second layer.

In Document (6), since the shielding electrode layer is connected to a drain electrode, the electrode layer also functions as means for transmitting signals. However, such an electrode layer has a high impedance against noise. Therefore, even if the electrode layer is used through an insulating layer having a small dielectric constant, the effect of the insulating layer is limited. Therefore, the electrode layer is easily influenced by an external electric field and an external magnetic field. In particular, when high-frequency signal lines and high-voltage power source lines are formed in the driving circuit of the pixel electrode (such a structure is often employed in the above-mentioned complicated circuits), the electrode layer is easily influenced by these lines.

Like the circuit (a circuit including more than one circuit elements such as a transistor and a capacitor) proposed by Documents (1) and (2), if the circuit structure is complicated and a plurality of circuit elements are used, the area of the circuit is increased and the circuit elements are likely to be exposed to external light. An example of such a circuit includes mono-crystalline silicon as a substrate base and employs a CMOS circuit structure in each circuit element.

The CMOS structure is formed by a pair of p-channel transistor and n-channel transistor. Therefore, when a semiconductor substrate is a p-type substrate, in order to fabricate a p-channel transistor, it is necessary to form in advance an n-type diffusion layer (called n-well layer) of the opposite conductivity to the p-type substrate in a region where the p-channel transistor is to be formed. However, the region where the p-channel transistor is to be formed is discretely present in each pixel element.

Therefore, there are a lot of restrictions in designing such an n-well layer. Consequently, the area necessary for forming the driving circuit of the pixel electrode is increased. However, as mentioned above, one of the demands for the pixel element is a reduction in size. In order to prevent an enlargement of the pixel electrode as much as possible even when the area of the driving circuit below the pixel electrode is increased, the driving circuit needs to be formed within the area of the pixel electrode.

An enlargement of the circuit area increases an area of the circuit element to be irradiated by the external light, and especially raises the probability that the external light irradiates a gap between pixels and circuit elements in the vicinity of the gap.

Moreover, in general, it is necessary to connect the n-well layer of the p-channel transistor to the highest potential of the circuit. However, if the n-well layer is discrete as mentioned above, a potential gradient is likely to be produced, and noise tends to occur. This is particularly noticeable when the panel size is increased.

In a plurality of driving circuits forming a transistor using polycrystalline silicon, both of the p-channel and n-channel transistors are present. However, as described above, in the conventional transistor structure, the anodic oxide film on the gate electrode is related to the channel resistance and the OFF-state current of the p-channel and n-channel transistors. Thus, different methods are often used for forming the anodic oxide film in the p-channel transistor and the n-channel transistor.

As a result, similar to the example of the n-well layer on the semiconductor substrate, in a plurality of circuits, the anodic oxide film for the n-channel transistor and the anodic oxide film for the p-channel transistor are discretely present. This makes it difficult to form anodic oxide films with an even film thickness in manufacturing the circuits, and causes remaining aluminum and removal defects when removing unwanted anodic oxide films later.

SUMMARY OF THE INVENTION

An object of the present invention is to efficiently form a driving circuit of a pixel electrode for preventing a lowering of the quality of the displayed image (a lowering of flicker and contrast level due to a leakage current flowing through a leakage resistance of liquid crystal without increasing the area of,the pixel electrode), propose a reliable structure, and provide an image display device capable of displaying a high-quality image by blocking external light and electromagnetic radiation and decreasing an influence of a leakage electric field from signal lines and scanning lines.

In order to achieve the above object, an image display device of the present invention includes a number of pixels for displaying an image, and circuit elements of a plurality of types for driving the pixels, wherein the pixels are arranged in a two-dimensional matrix on a substrate, the circuit elements are monolithically formed on the substrate, and at least one type of the circuit elements in adjacent pixels are positioned close to each other in peripheral sections of the pixels, which face each other.

With this structure, in the case where circuit elements such as a plurality of switching elements, for example, p-channel transistors and n-channel transistors, and capacitors are monolithically formed on the substrate, when forming an n-type diffusion layer on the substrate to monolithically fabricate a type of circuit elements, for example, p-channel transistors on the substrate, it is possible for the p-channel transistors to share at least a part of the n-type diffusion layer.

This structure reduces the area occupied by the circuit elements for driving the pixels, improves the efficiency of forming the circuit elements and the reliability of the circuit elements compared to a conventional structure in which a n-type diffusion layer is formed in each pixel.

It is also possible to symmetrically arrange the circuit elements for driving the pixels with respect to the borderline between the pixels. It is still possible to substantially symmetrically arrange at least part of the circuit elements with respect to a point on the borderline between the pixels. With these structure, it is possible to eliminate designing of a part of the circuit elements. Consequently, it is possible to simplify the design of the circuit elements. Moreover, since the circuit pattern for forming the circuit element can be used in common in the respective circuit elements, the production cost of the circuit elements is reduced.

Furthermore, it is possible to arrange the wiring for driving the circuit elements along the borderlines between the pixels and share the wiring between the adjacent pixels. This structure enables a reduction in the area required for the formation of the circuit elements.

It is also possible arrange the circuit elements on a back surface of the reflective electrodes through an insulating film so that at least part of the circuit elements of adjacent pixels overlaps the adjacent pixel. This structure restrains an increase in the area of the circuit elements while shielding the circuit elements from light by the reflective electrodes. In addition, if the overlapping circuit elements are of the same type, for example, p-channel transistors, it is possible to share at least part of the n-type diffusion layer of the p-channel transistors.

Another image display device of the present invention includes a first line formed by a first conducting material for driving circuit elements, a shield electrode formed by a second conducting material, reflective electrodes formed by a third conducting material, a first insulating layer for separating the circuit elements and the shield electrode and a second insulating layer for separating the shield electrode and the reflective electrodes, wherein the first line, the shield electrode, and the reflective electrodes are laminated in this order on the substrate from a back surface toward a front surface, and the shield electrode covers the circuit elements and the first line through the first insulating layer, is connected to the first line, and covers the reflective electrodes and portions between said reflective electrodes through the second insulating layer.

With this structure, not only the reflective electrodes, but also the shield electrode functions as a light blocking layer. In this case, compared to a structure in which the circuit elements are shielded from light by only one layer of the reflective electrodes, a reduction of a light leakage current by only one layer of the circuit elements is achieved by the shield electrode without increasing the area of the reflective electrodes.

Moreover, since the shield electrode is connected to the first line of the first conducting material, it is possible to shield the circuit elements from electromagnetic radiation. This structure prevents a lowering of the quality of image displayed in the pixels, thereby providing a high-quality displayed image.

In the image display device, the dielectric constant of the first insulating layer may be set smaller than the dielectric constant of the second insulating layer.

With this structure, it is possible to arrange a dividing ratio of potential due to a leakage electric field from the circuit element and the wiring connecting the circuit elements, which is applied to the first and second insulating layers, to be larger in the first insulating layer than in the second insulating layer. It is thus possible to restrain the potential difference caused by the leakage electric field on the reflective electrodes which are in contact with the second insulating layer.

Moreover, this structure prevents a lowering of the quality of image displayed by the pixels which is caused by the application of incorrect potential to the reflective electrodes due to the influence of the leakage electric field on the reflective electrodes.

Additionally, in the image display device, it is possible to arrange the thickness of the first insulating layer to be larger than that of the second insulating layer. With this arrangement, it is possible to make the dividing ratio of potential to be applied to the first insulating layer larger than the potential dividing ratio to be applied to the second insulating layer. Consequently, it is possible to restrain the potential difference caused by the leakage current on the reflective electrodes which are in contact with the second insulating.

This structure also prevents a lowering of the quality of image displayed by the pixels which is caused by the application of an incorrect potential to the reflective electrodes due to the influence of the leakage electric field on the reflective electrodes.

In addition, in the image display device, it is possible to arrange the thickness of the first insulating layer for separating the circuit elements and the shield electrode as a shield layer to be larger than that of the second insulating layer for separating the shield electrode and the reflective electrodes. With this arrangement, it is possible to restrain the potential difference caused by the leakage electric field on the reflective electrodes. This structure therefore prevents a lowering of the quality of image displayed by the pixels which is caused by the application of an incorrect electric field to the reflective electrodes due to the influence of the leakage electric field on the reflective electrodes.

Alternatively, the image display device may include a second wiring layer formed by a second conducting material for driving the circuit elements so that the second wiring layer and the shield layer together form one layer on the substrate. With this structure, it is possible to form the second wiring layer and the shield layer at the same time, thereby restraining an increase in the number of processes for forming the shield electrode.

For a fuller understanding of the nature and advantages of the invention, reference should be made to the ensuing detailed description taken in conjunction with the accompanying drawings.

DESCRIPTION OF PREFERRED EMBODIMENTS

[Embodiment 1]

The following description discusses one embodiment of the present invention with reference to FIGS. 1 to 6.

Figure 2:
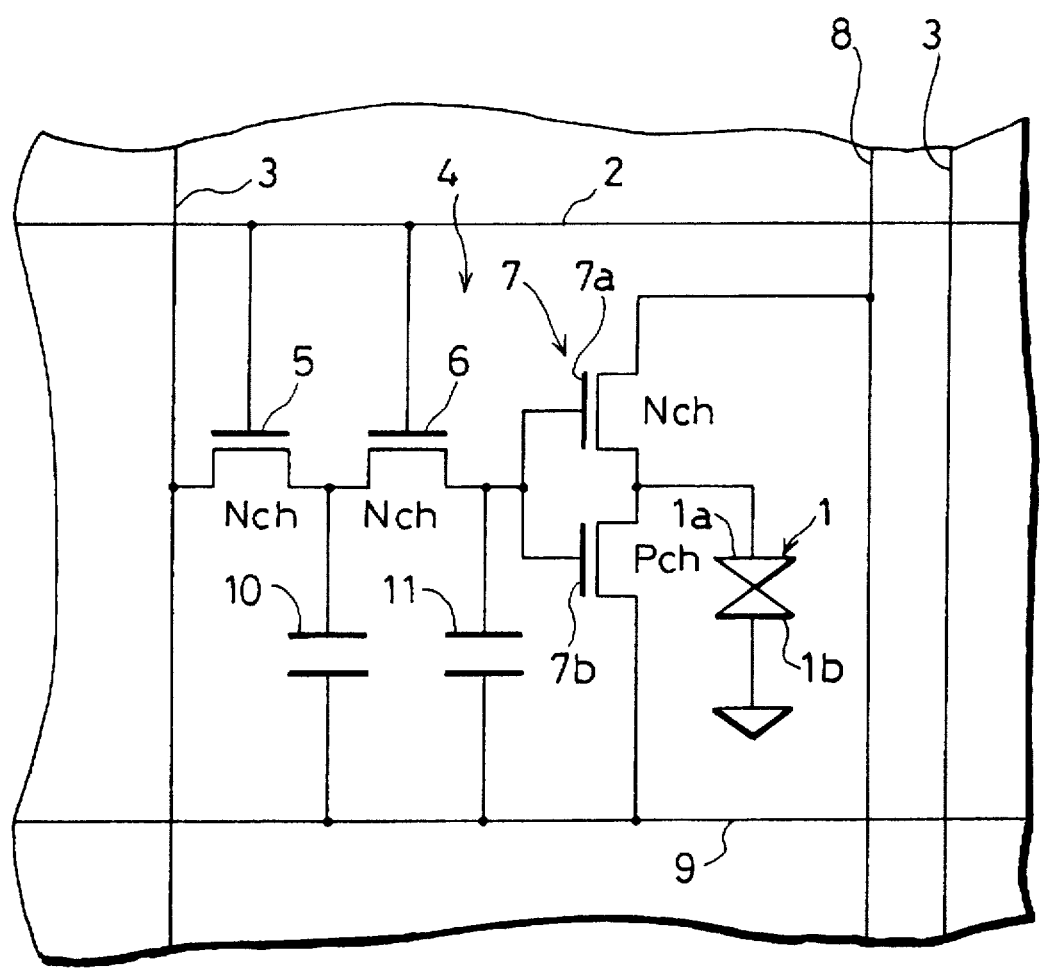
FIG. 2 is an equivalent circuit diagram of the pixel.

A reflective liquid crystal display device is given as an example of an image display device. As illustrated in FIG. 2, in the liquid crystal display device, a number of pixels 1 in the form of cells for displaying an image based on scanning signals and data signals are arranged in a two-dimensional matrix like squares of a chessboard, on a substrate.

Although it is not shown in FIG. 2, each pixel 1 includes liquid crystal whose rotation angle varies with a change in an electric field, and a polarizing plate for polarizing the incident light and emitting the polarized light.

The pixel 1 also includes a pixel electrode 1a for changing the electric field and a counter electrode 1b. The pixel electrode 1a is an electrode formed by a metal mirror which reflects light. The pixel electrodes 1a are arranged in a matrix corresponding to the positions of the pixels 1 on a back surface of the substrate which is opposite to a front surface on which an image is displayed.

The counter electrode 1b is arranged on the front surface of the substrate as a common electrode of the respective pixels 1 so that it is parallel to and faces the pixel electrodes 1a. The counter electrode 1b is a light transmitting electrode formed by, for example, ITO (indium tin oxide).

In this liquid crystal display device, scanning lines 2 and data signal lines 3 are arranged to enclose the pixels 1. The scanning line 2 transmits the scanning signal to the pixel 1, while the data line 3 transmits the data signal to the pixel 1. Therefore, the scanning lines 2 and the data signal lines 3 are arranged to cross each other at right angles in squares.

Moreover, a driving circuit 4 for driving the pixel 1 is monolithically formed for each pixel 1. The driving circuit 4 includes a switching transistor 5 and a switching transistor 6. The transistors 5 and 6 output signals for turning on and off the pixel 1 according to signals from the scanning signal line 2 and the data signal line 3.

The transistors 5 and 6 are connected in series. The gates of the transistors 5 and 6 are connected to the common scanning line 2.

The reason why the transistors 5 and 6 are connected in series is to reduce the leakage current. One of the terminals of the transistor 5, drain, is connected to the data signal line 3. The source of the transistor 5 is connected to the drain of the transistor 6.

The driving circuit 4 also includes a CMOS circuit 7 as a buffer amplifier, and a positive power source line (VCC) 8 and a negative power source line (VSS) 9 as power sources of the CMOS circuit 7. The CMOS circuit 7 drives the pixel 1 by an ON-state voltage from the source of the transistor 6.

The CMOS circuit 7 includes an n-channel transistor 7a and a p-channel transistor 7b which are complementarily connected. CMOS stands for complementary metal-oxide semiconductor.

The gates of the n-channel transistor 7a and the p-channel transistor 7b are connected together to the source of the transistor 6. The drains of the n-channel transistor 7a and the p-channel transistor 7b are connected together to the pixel 1. The source of the n-channel transistor 7a is connected to the positive power source line 8, while the source of the p-channel transistor 7b is connected to the negative power source line 9.

The driving circuit 4 further includes a hold capacitor 10 and a hold capacitor 11, for maintaining the ON-state voltage. One of the terminals of the hold capacitor 10 is connected to the source of the transistor 5, and the other terminal is connected to the negative power source line 9. One of the terminals of the hold capacitor 11 is connected to the source of the transistor 6, and the other terminal is connected to the negative power source line 9.

Thus, by connecting the transistors 5 and 6 in series and providing the hold capacitors 10 and 11, the data charged in the hold capacitors 10 and 11 through the transistors 5 and 6 is not changed by a change in the potential of the data signal line 3.

In such a driving circuit 4, if n-channel transistors, for example, are used as the transistors 5 and 6, the driving circuit 4 includes four MOS transistors, i.e., three n-channel transistors and one p-channel transistor, and two capacitors.

In this driving circuit 4, the gates of the n-channel transistor 7a and the p-channel transistor 7b have high impedances. Therefore, the voltage of the ON-state signal applied to the hold capacitor 11 by the switching transistors 5 and 6 is maintained without attenuation due to a leakage, and input to the gate of the CMOS circuit 7 as the buffer circuit.

As a result, in the driving circuit 4, even in a period in which the scanning signal lines 2 is active low and the transistors 5 and 6 are turned off, the n-channel transistor 7a or the p-channel transistor 7b of the CMOS circuit 7 remains in the ON-state, and applies a suitable voltage to the pixel electrode 1a of the pixel 1.

Figure 1:
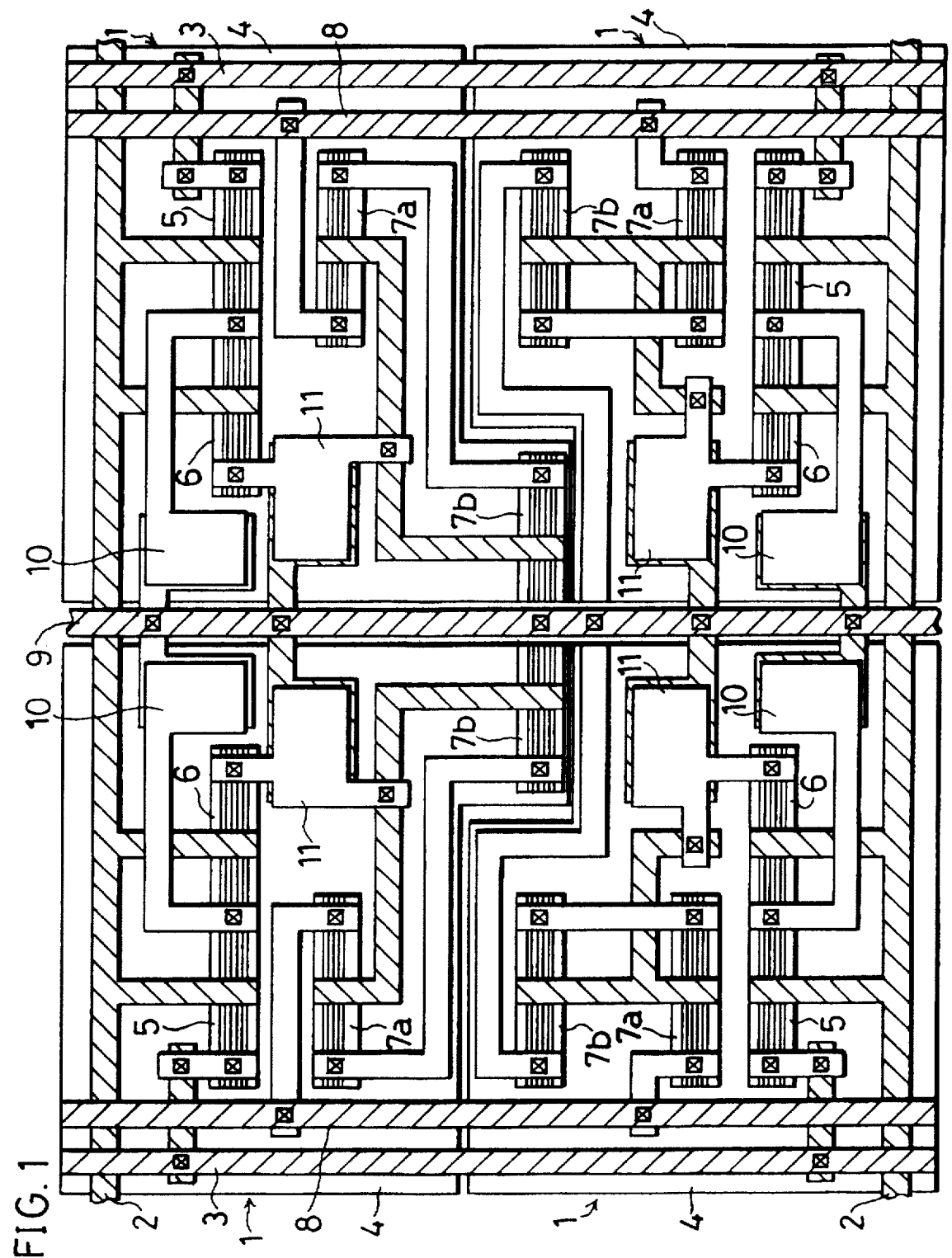
FIG. 1 is an explanatory view showing four pixels arranged adjacent to each other in an image display device according to Embodiment 1 of the present invention.
Figure 3:
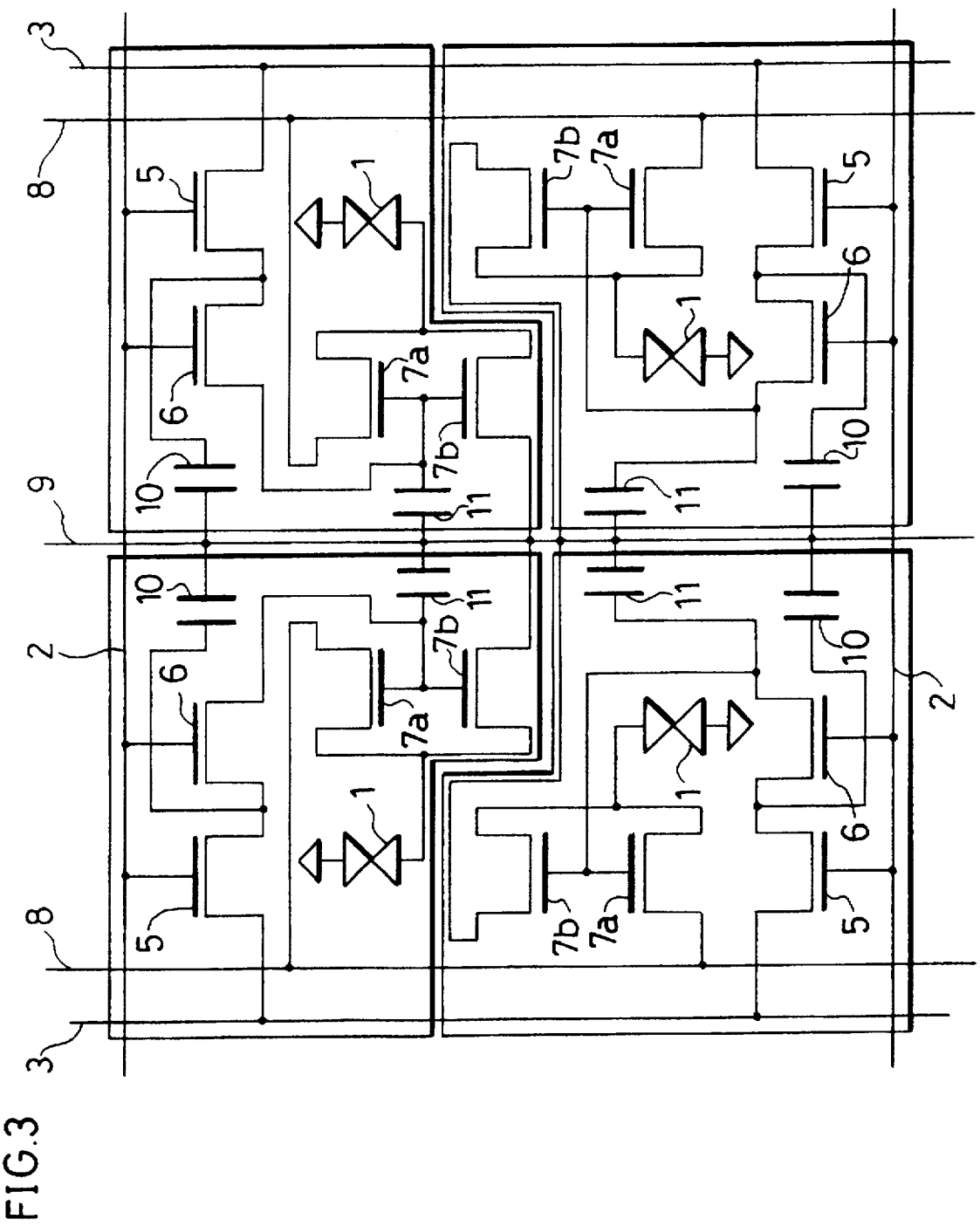
FIG. 3 is an equivalent circuit diagram when four pixel are arranged adjacent to each other.

In the structure of this embodiment, as illustrated in FIG. 1 and FIG. 3, the transistors 5 and 6, the CMOS circuits 7, and the hold capacitors 10 and 11 are arranged so that the respective driving circuits 4 are symmetrical with respect to the negative power source line 9. With this arrangement, the transistors 5 and 6, the CMOS circuits 7 and the hold capacitors 10 and 11 in a pair of adjacent driving circuits 4 can share one negative power source line 9.

Moreover, the transistors 5 and 6, and the CMOS transistors 7 as buffers in adjacent pixels 1 aligned in a vertical direction are arranged substantially symmetrically with respect to the center point of the borderline between the pixels 1.

Furthermore, in a pair of adjacent pixels 1 positioned along the negative power source line 9, the driving circuits 4 are fabricated so that part of each driving circuit 4 overlaps the adjacent pixel 1. In this embodiment, each driving circuit 4 is fabricated so that about a half of the area of the p-channel transistor 7b overlaps the adjacent pixel 1.

As described above, in this liquid crystal display device, by fabricating the driving circuits 4 of the four pixels 1 symmetrically about the negative power source line 9, one negative power source line 9 can be shared by the adjacent driving circuits 4 on both sides of the negative power source line 9. It is thus possible to reduce the number of the negative power source lines 9 to a half of the number of lines used in a conventional structure.

As mentioned above, since the driving circuits 4 on both sides of the negative power source line 9 are symmetrical about the negative power source line 9 and since the transistors 5 of the driving circuits 4 of adjacent pixels 1 aligned in a vertical direction are symmetrical about the center point of the borderline therebetween, it is only necessary to design the layout of the circuits on one side even if the circuit structure is complex. It is therefore possible to reduce the time required for designing the layout of the circuits.

With this structure, four pixels 1 are treated as one block, and it is only necessary to dispose four driving circuits 4 in one block. Therefore, compared to a conventional structure in which one driving circuit 4 is fabricated in a square region of a two-dimensional matrix formed by scanning lines and signal lines, the arrangement of elements of the driving circuits 4, such as the transistors 5, is less restricted. Thus, the degree of freedom in arranging the elements of the driving circuits 4 is high. Moreover, when forming one driving circuit 4, there is no need to store the driving circuit 4 in the corresponding one pixel 1, requiring a reduced area.

As a result, since the freedom of arranging the elements constituting the driving circuit 4 is increased, it is possible to carry out high-level drive and control of pixels 1 using the driving circuits 4 formed by a plurality of elements, thereby improving the quality of the displayed image.

Figure 4:
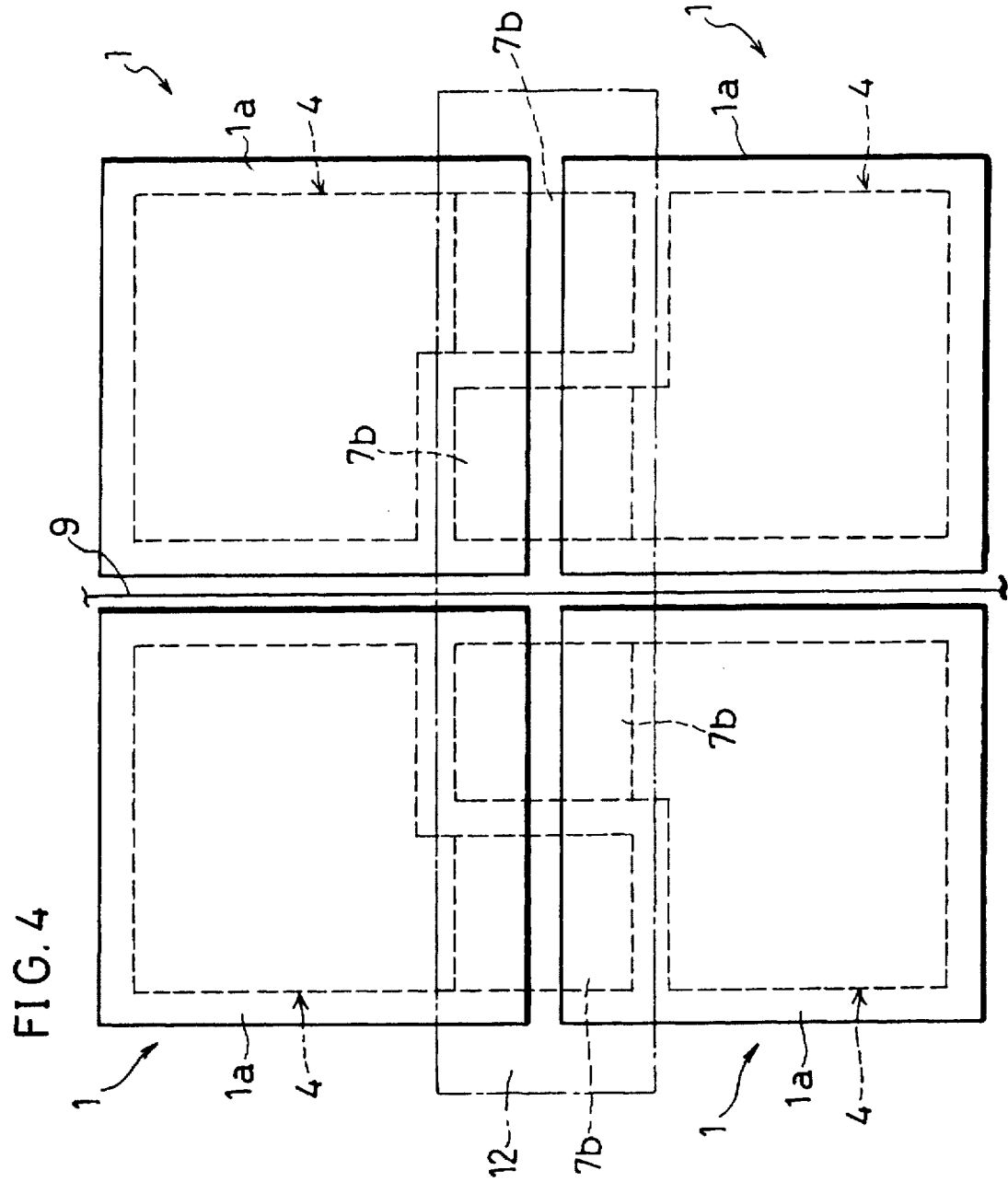
FIG. 4 is a schematic plan view showing that parts of driving circuits overlap each other in the adjacent pixels.
Figure 6:
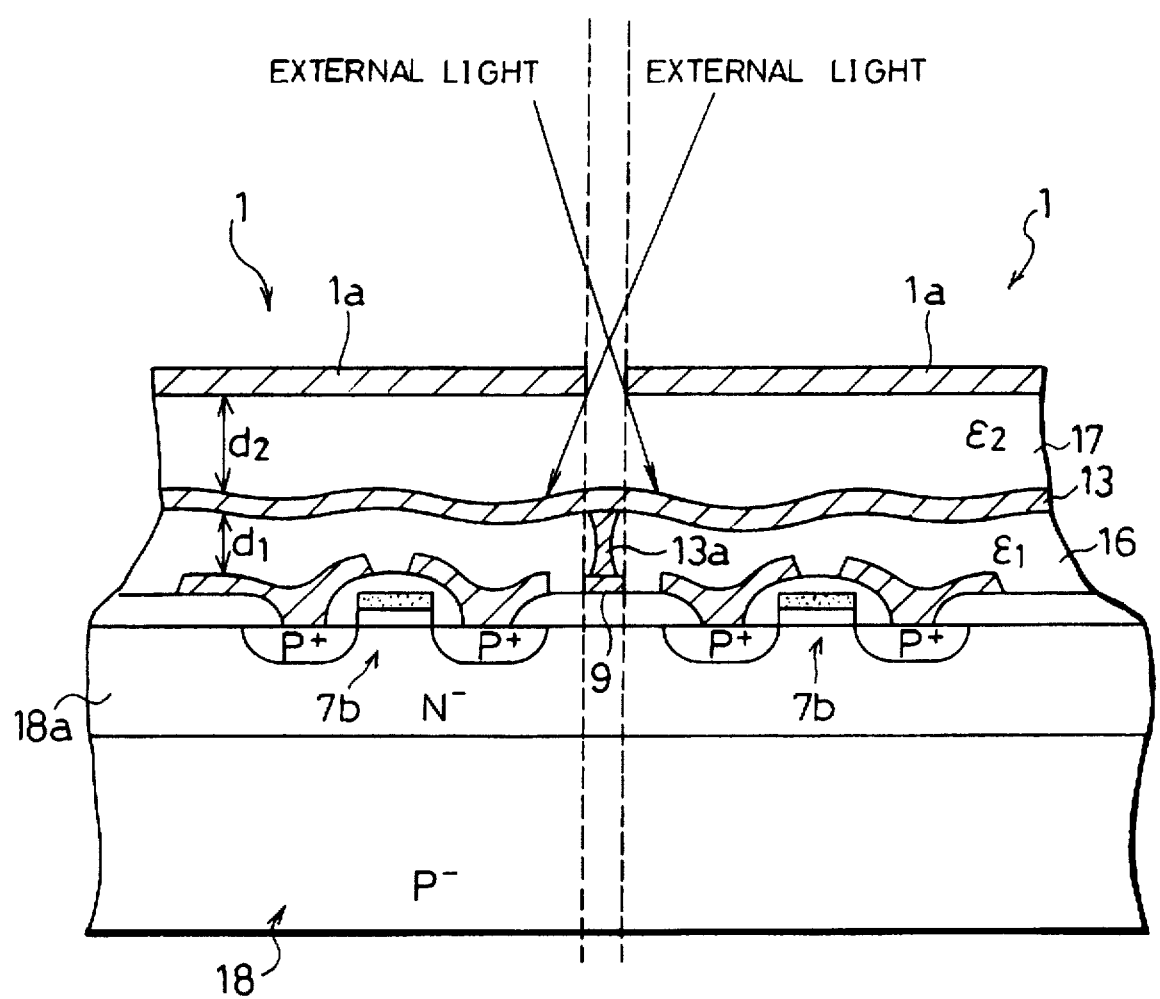
FIG. 6 is a cross section of the shield electrode, cut across the A—A line shown in FIG. 5.

Referring now to FIG. 4, the following description discusses one example of the structure of the driving circuit 4. In this example, about a half the area of the p-channel transistor 7b of the driving circuit 4 overlaps the adjacent pixel 1. FIGS. 4 and 6 mainly illustrate the arrangement of the p-channel transistors 7b of the driving circuits 4 shown in FIGS. 1 and 3 so as to assist in understanding the following explanation.

As clear from FIG. 4, in one block constituted by four pixels 1, the upper and lower adjacent driving circuits 4 along the negative power source line 9 are formed below the pixel electrodes 1a as reflective electrodes so that the p-channel transistor 7b of each driving circuit 4 overlaps the adjacent pixel 1.

By arranging the p-channel transistors 7b of the driving circuits 4 to overlap of the adjacent pixels 1 aligned in a vertical direction in the block, respectively, it is possible to gather the p-channel transistors 7b among the transistor elements constituting the driving circuits 4 of the block at the center between the two pixels 1.

The following description discusses one example of the fabrication of transistors in a substrate 18 shown in FIG. 6. In this example, a p-type semiconductor is fabricated as the substrate 18. In order to fabricate the p-channel transistors 7b in the substrate 18 of the p-type semiconductor, it is necessary to form an n-well layer 18a of the opposite conductivity type as an n-type diffusion layer in advance. In this case, as described above, if the p-channel transistors 7b are arranged to overlap the adjacent pixels 1 aligned in a vertical direction in the group, respectively, it is possible to gather the n-well layers in a region 12 on an imaginary center line perpendicular to the negative power source line 9 in the block as shown in FIG. 4.

Namely, as illustrated in FIG. 4, it is possible to gather the n-well layers of the p-channel transistors 7b of the upper and lower driving circuits 4 in one block in alignment in parallel with the scanning line. Consequently, the n-well layer of the p-channel transistors 7b is not discrete and can be efficiently used.

It is also necessary to arrange the electric potential of the n-well layer as the substrate potential of the p-channel transistor 7b to be equal to an electric potential of the positive power source. In this case, if the n-well layers are present in discrete locations, a potential gradient is likely to be produced. The potential gradient is particularly significant when the panel is large in size. Whereas if the pixels 1 share the n-well layers aligned on a straight line, it is possible to stably maintain the electric potential constant even when the area of the panel is increased.

On the other hand, when fabricating transistors on the substrate of n-type semiconductor, it is necessary to form p-well layers as p-type diffusion layers of the opposite conductivity type to the n-type substrate. It is therefore preferable to gather the n-channel transistors 7a.

Figure 5:
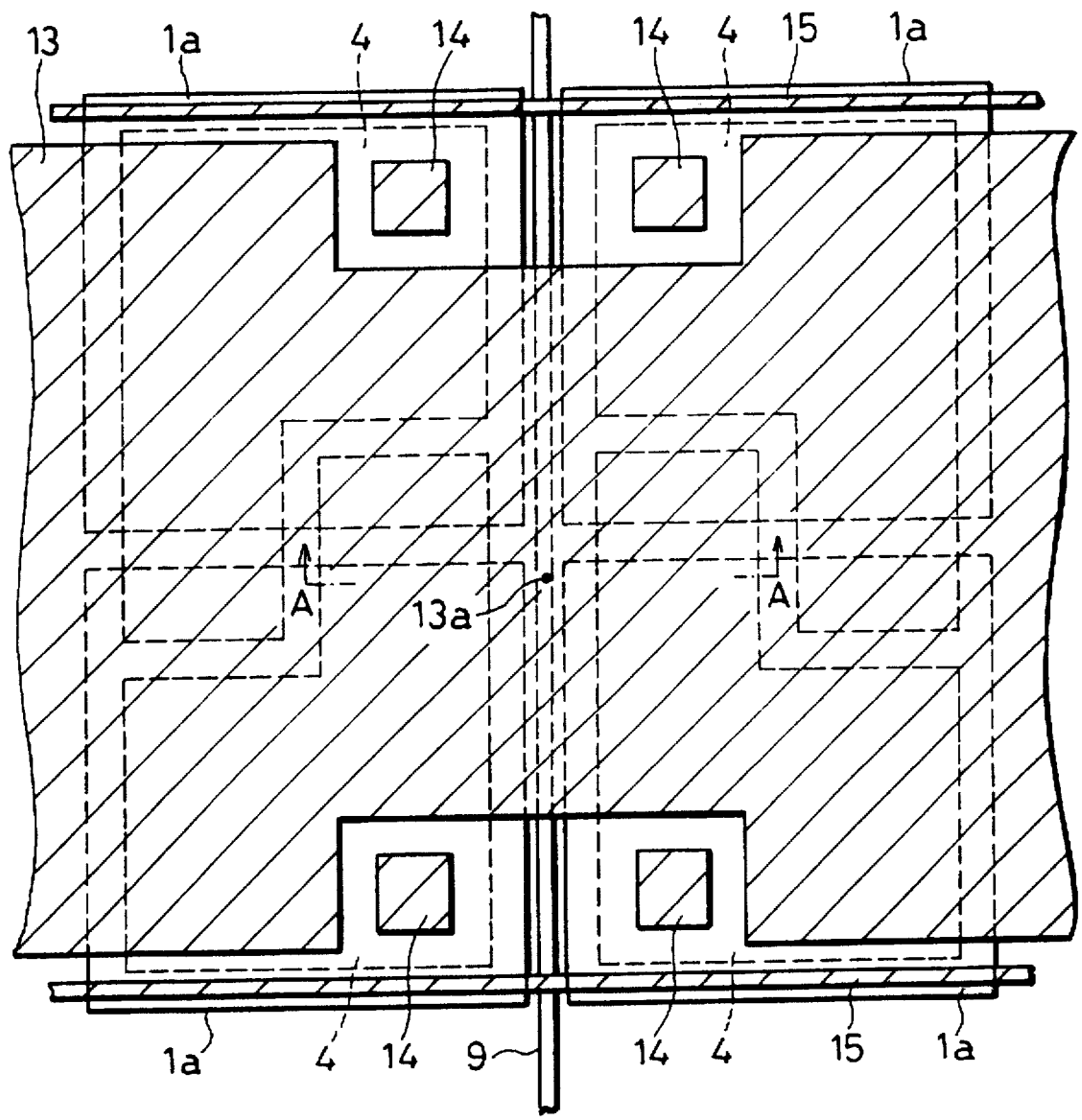
FIG. 5 is a schematic plan view of the pixels, showing that parts of driving circuits overlap each other in the adjacent pixels and a shield electrode is further formed.

As illustrated in FIG. 5, a shield electrode 13 is positioned between the driving circuits 4 and the pixel electrodes 1a. The shield electrode 13 restrains leakage light from the pixel electrode 1a as the reflective electrode from striking on the driving circuit 4.

Namely, with the structure of this embodiment, the driving circuits 4 are formed by the first metal layer, and the pixel electrodes 1a are formed by the third metal layer. The shield electrode 13 is formed by the second metal layer between the driving circuits 4 and the pixel electrodes 1a through an insulating layer (not shown) between the shield electrode 13 and driving circuits 4 and an insulating layer between the shield electrode 13 and pixel electrodes 1a.

As shown by hatching, the shield electrode 13 is continuously formed in a region excluding contact sections 14 of the second and third layers and wiring 15 of the second metal layer (the second wiring layer) formed by the same second metal layer. Namely, the shield electrode 13 is continuously formed below the four adjacent pixel electrodes 1a arranged in a square to overlap the pixel electrodes 1a.

The shield electrode 13 is connected to the negative power source line 9 of the first metal layer through a contact section 13a shown by the black dot at the center.

In this structure, since the shield electrode 13 functions as a shielding layer, external light which has fallen on the shield electrode 13 through a gap between the pixel electrodes 1a is blocked by the shield electrode 13. It is therefore possible to more effectively reduce the light leakage current in the transistors forming the driving circuits 4 compared to the light blocking structure formed by one layer of the pixel electrodes 1a.

In addition, by connecting the shield electrode 13 formed by the second metal layer to the negative power source line 9 having the lowest electric potential of the driving circuit 4, it is possible to shield the transistors forming the driving circuits 4 from electromagnetic radiation. Furthermore, the shield electrode 13 prevents crosstalk due to capacitive coupling between the pixel electrode 1a and the wiring 15.

In particular, in the structure of FIG. 4 where the p-channel transistor 7b overlaps the upper or lower pixel 1, when the external light is irradiated, it passes through the gap between the pixels 1 and falls on the p-channel transistor 7b. Then, the shield electrode 13, which is arranged to overlap the adjacent pixels 1 arranged in a square as shown in FIG. 5, prevents the external light from being irradiated on the p-channel transistors 7b, thereby producing a greater external light blocking effect.

Next, the cross sectional structure of essential sections of the pixels 1 including the shield electrode 13 will be explained with reference to FIG. 6 which shows a cross section of FIG. 5 cut across the A—A line. In FIG. 6, $\epsilon_1$ represents a dielectric constant of an insulating layer 16 for separating the driving circuits 4 and the shield electrode 13, and $\epsilon_2$ represents a dielectric constant of an insulating layer 17 for separating the shield electrode 13 and the pixel electrodes 1a. If the relationship $\epsilon_1 < \epsilon_2$ is achieved, the dividing ratio of potential to be applied to the pixel electrodes 1a of the pixels 1 by a leakage electric field is decreased. It is thus possible to reduce the vicious effect on the pixel electrodes 1a caused by the leakage electric field, and prevent deterioration of the quality of the image displayed by the pixels 1.

The thicknesses of the insulating layer 16 and the insulating layer 17 are denoted by $d_1$ and $d_2$, respectively. Similarly to the above, it is possible to reduce the leakage electric field to be applied to the pixel electrodes 1a of the pixels 1 by achieving the relationship $d_1 > d_2$. It is thus possible to further reduce the vicious effect on the pixel electrodes 1a caused by the leakage electric field and prevent deterioration of the quality of the image displayed by the pixels 1.

FIG. 6 illustrates the structure in which the pixels 1 share the n-well layer 18a of the p-channel transistors 7b shown in FIG. 5, and the structure of a cross section of the shield electrode 13 formed by the second metal layer for blocking external light irradiated through the gap between the pixel electrodes 1a.

When forming the wiring 15 such as the signals lines and power source lines by the second metal layer, by forming the shield electrode 13 with the second metal layer and the contact section 14 for connecting the second and third metal layers at the same time, it is possible to efficiently fabricate the shield electrode 13 and the contact section 14 without increasing the number of fabrication processes. Furthermore, this arrangement also enables a reduction in the area of the pixel 1.

[Embodiment 2]

Figure 7:
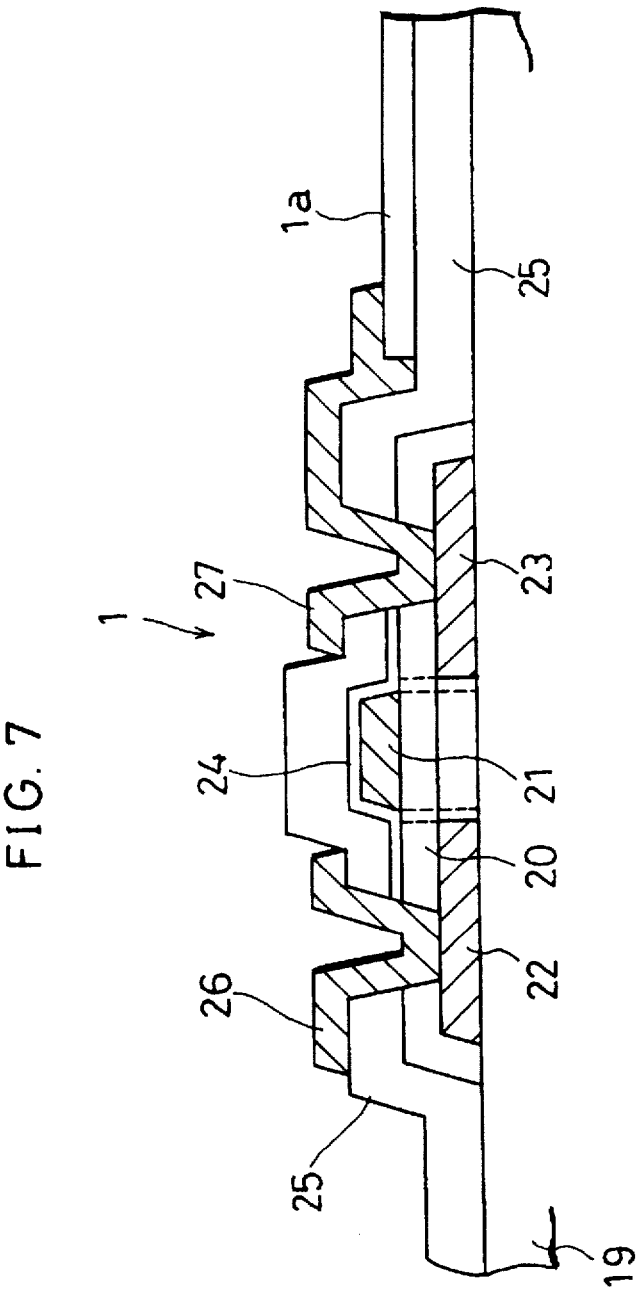
FIG. 7 is a schematic view showing the structure of a transistor in the image display device according to Embodiment 2 of the present invention.
Figure 8:
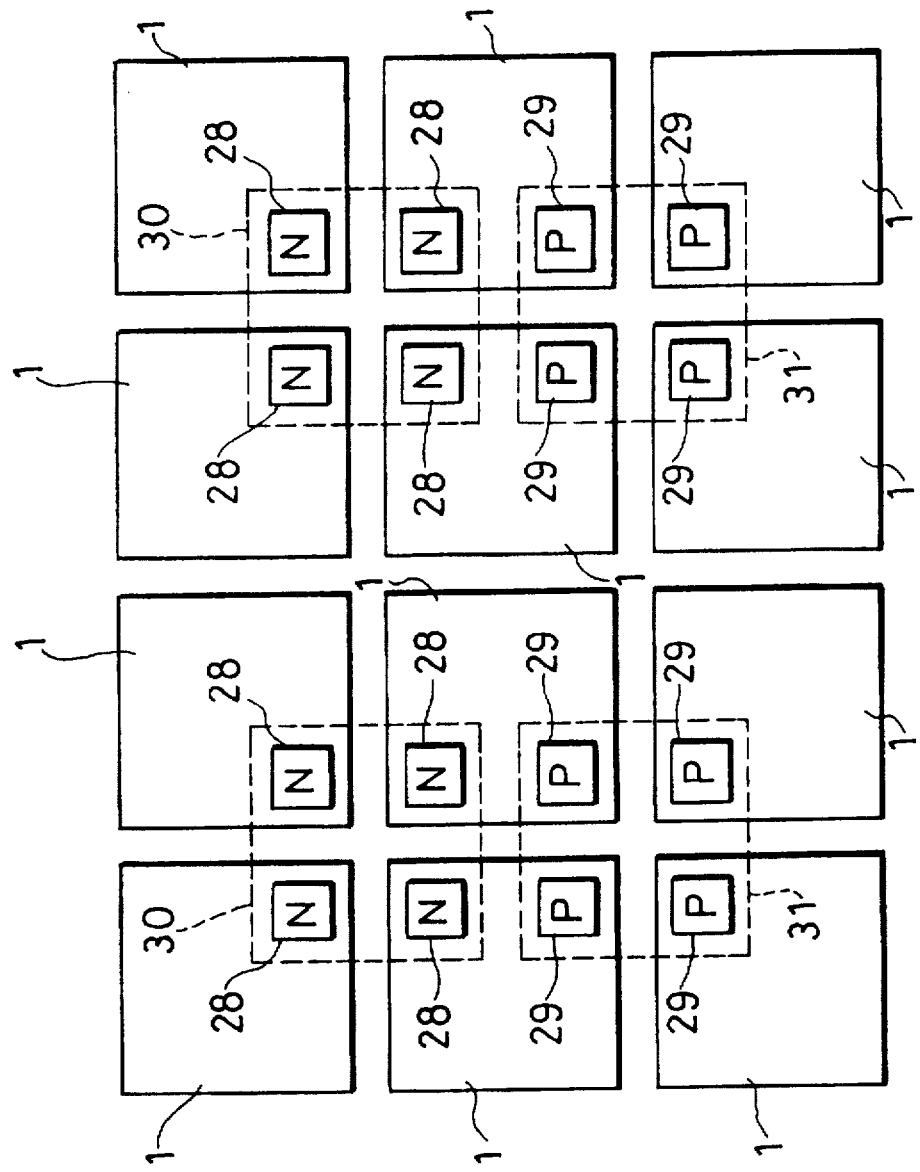
FIG. 8 is a schematic plan view showing an arrangement of pixels and transistors for driving the pixels in the image display device.
Figure 9:
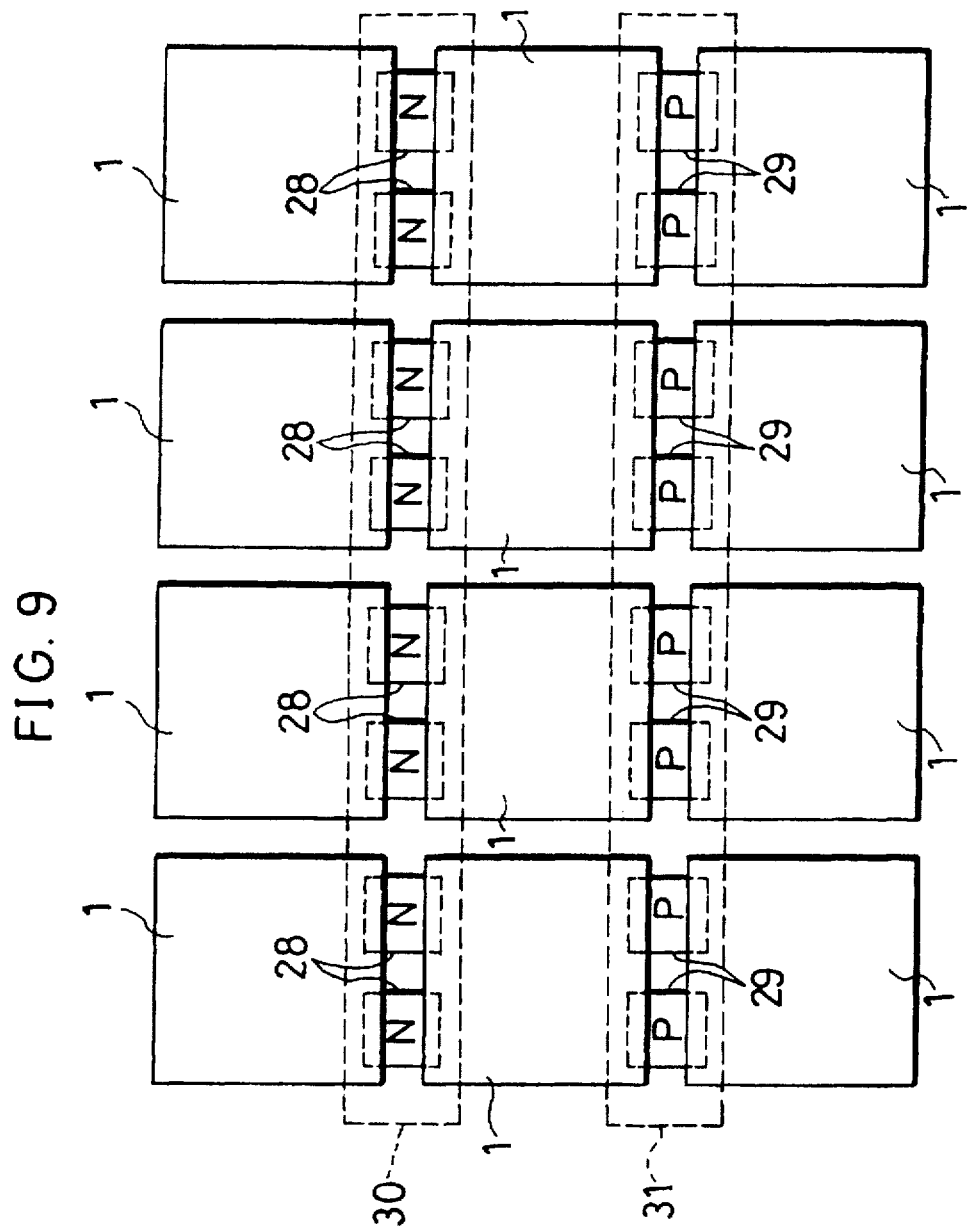
FIG. 9 is a schematic plan view showing another example of the arrangement.

The following description discusses another embodiment of the present invention with reference to FIGS. 7 to 9.

The difference between Embodiments 1 and 2 is that the transistor is formed on the semiconductor substrate 18 in Embodiment 1, while the transistor is formed by polycrystalline silicon on an insulator substrate in Embodiment 2. An example of forming the driving circuit 4 of the pixel 1 by at least one element made of polycrystalline silicon will be explained. In this example, at least one p-channel transistor and n-channel transistor are formed in one pixel 1.

Referring now to FIG. 7, the following description explains the structure of a transistor formed by polycrystalline silicon on a glass substrate 19 as the insulator substrate and the manufacturing method thereof. FIG. 7 is a view showing the structure of the n-channel transistor.

First, a base coat (not shown) is formed by silicon dioxide ($SiO_2$) on the glass substrate 19. Second, an amorphous silicon film is deposited on the base coat by, for example, plasma CVD. Then, by growing the amorphous silicon film in solid phase or by crystallizing it using a laser, non-doped polycrystalline silicon (hereinafter referred to as polysilicon) is formed. Thereafter, a gate oxide film 20 is formed by oxidizing polysilicon with heat.

Next, a gate electrode 21 is formed by aluminum (Al) on the gate oxide film 20. Then, when forming an n-channel transistor, n-type ions such as boron ions are implanted in predetermined location and n$^+$ polysilicon are formed on both sides of the gate electrode 21 so as to produce a source 22 and a drain 23. On the other hand, when forming a p-channel transistor, p-type ions such as phosphorus ions are implanted in the manner same as the above.

Subsequently, an anodic oxide film 24 is formed on the gate electrode 21 by anodic oxidation. Next, a layer-to-layer insulating film 25 is formed, and contact openings are formed in the insulating film 25. Then, a source line 26 and a drain line 27 are formed by aluminum. Finally, one of the source line 26 and the drain line 27, for example, the drain line 27 in FIG. 7, is connected to the pixel electrode 1a as a transparent conducting film (ITO) so as to form the transistor of the pixel 1.

The method for forming the anodic oxide film 24 on the gate electrode 21 may be separately varied in the p-channel transistor and n-channel transistor so as to optimize the channel resistance and the OFF-state current between the source 22 and the drain 23 as well as to increase the heat resistance of the gate electrode 21.

In the image display device of this embodiment, as illustrated in FIGS. 8 and 9, transistors for driving adjacent pixels 1 are arranged so that transistors of the same channel, for example, n-channel transistors 28 and p-channel transistors 29 are respectively disposed adjacent to each other.

In FIG. 8, the n-channel transistors 28 or the p-channel transistors 29 are gathered on the four adjacent corners of four adjacent pixels 1, which face each other. In this case, the anodic oxide film of the n-channel transistor 28 is formed within a region enclosed by the dot line 30. The anodic oxide film of the p-channel transistor 29 is formed within a region indicated by the dot line 31.

It is thus possible to separately form the anodic oxide films in two kinds of regions enclosed by the dot lines 30 and 31 by methods peculiar to the respective anodic oxide films. As a result, complicated mask patterns are not required. Moreover, since the accuracy of control is improved, it is possible to fabricate anodic oxide films having an even film thickness and an even length.

It is therefore possible to obtain satisfactory uniform transistor characteristics without disparity in the n-channel transistors 28 and the p-channel transistors 29. In addition, with the use of the anodic oxide film, it is necessary to remove unnecessary portions (including the wiring) later. However, with the above-mentioned arrangement of the n-channel transistors 28 and the p-channel transistors 29, the area from which the anodic oxide film is to be removed is not complicated. Consequently, a removal defect is unlikely to occur, and aluminum is unlikely to remain.

FIG. 9 shows another example of forming the n-channel transistors 28 close to each other and the p-channel transistors 29 close to each other. In this example, in adjacent pixels 1 aligned in a vertical direction, the n-channel transistors 28 and the p-channel transistors 29 are respectively aligned in a horizontal direction by arranging the n-channel transistors 28 and the p-channel transistors 29 to overlap the adjacent pixels 1.

FIGS. 8 and 9 merely show typical examples of gathering the transistor elements of the same conductivity type in adjacent locations in the pixels 1. Namely, it is possible to align the transistors elements in a different manner as long as the anodic insulating film is formed in a simple continuous pattern.

[Embodiment 3]

The following description discusses still another embodiment of the present invention with reference to FIGS. 10 to 14. In Embodiments 1 and 2, in order to form transistors, mono-crystalline silicon is used on a semiconductor substrate, or polycrystalline silicon is used on an insulator substrate. On the other hand, in Embodiment 3, in order to fabricate other circuit elements, for example, a capacitor, mono-crystalline silicon is used on a semiconductor substrate, or polycrystalline silicon is used on an insulator substrate.

Figure 10:
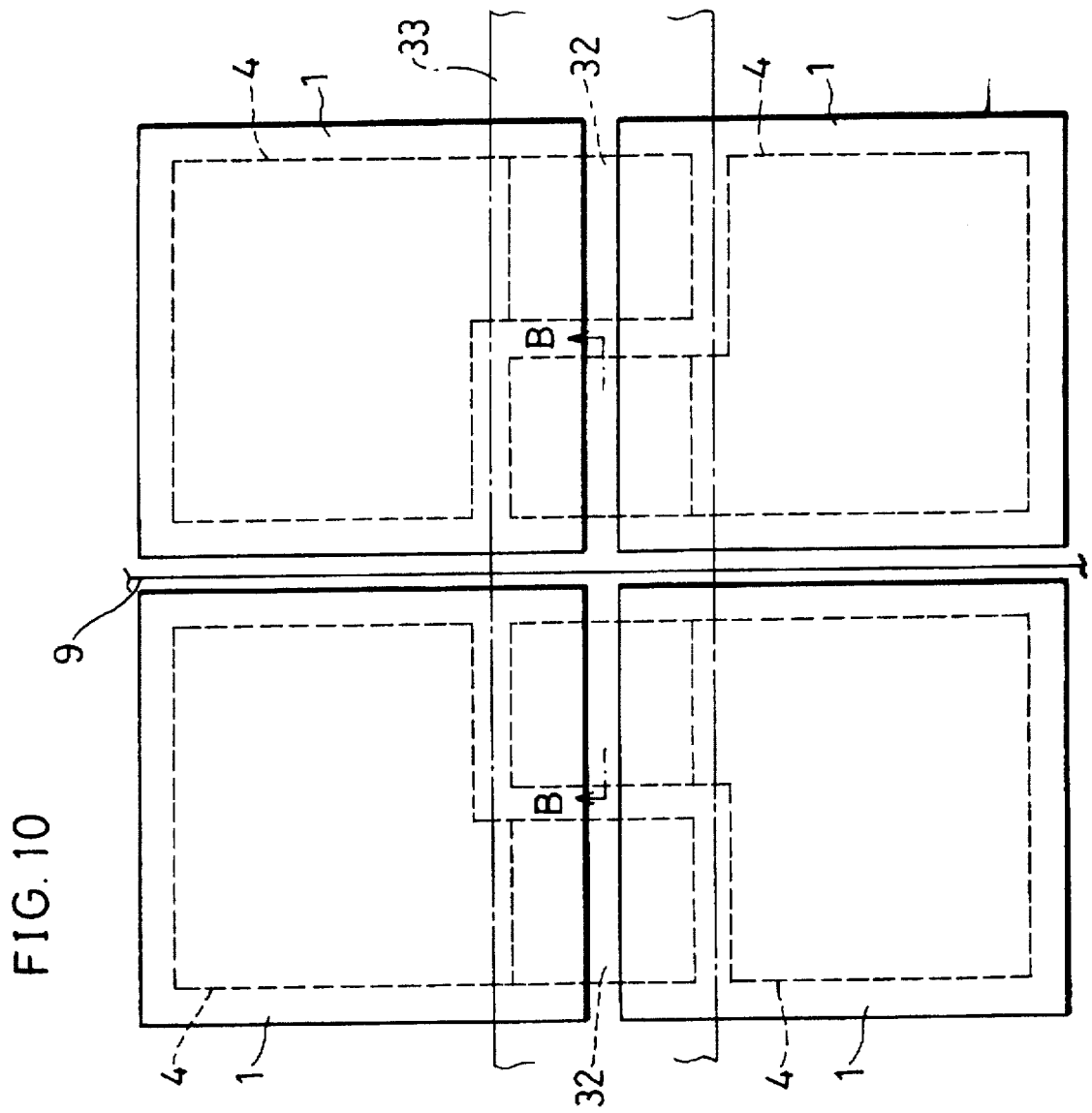
FIG. 10 is a schematic plan view showing the installation position of a capacitor which is mounted to overlap the pixel in an image display device according to Embodiment 3 of the present invention.
Figure 11:
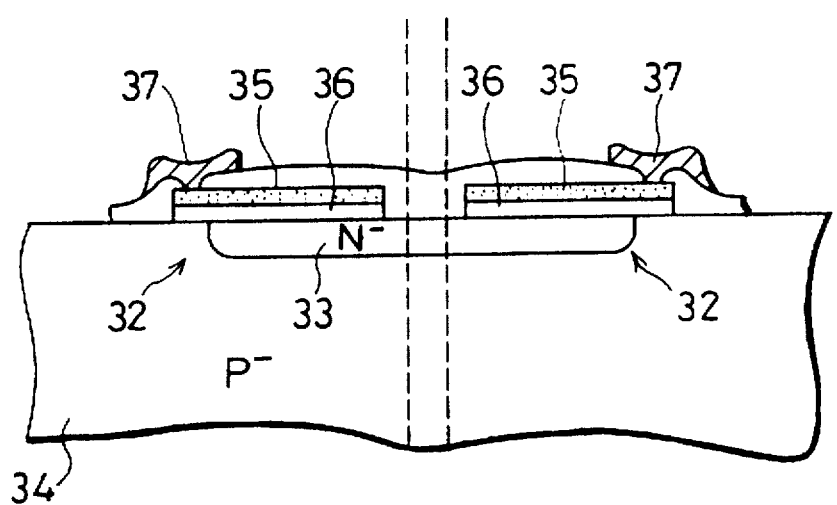
FIG. 11 is a cross section of the capacitor, cut across the B—B line of FIG. 10.

Similar to Embodiments 1 and 2, four pixels 1 are treated as one block as shown in FIG. 10 in which each capacitor 32 is arranged to overlap the adjacent pixel 1. FIG. 11 is a cross section of FIG. 10, cut across the B—B line.

For example, a p-type semiconductor substrate 34 is used for the fabrication of the capacitor 32. In the capacitor 32, one of the terminals is an n-well layer, i.e., n-type diffusion layer 33, formed on the semiconductor substrate 34, the other terminal is a polysilicon layer 35, and an insulating layer 36 is formed between the diffusion layer 33 and the polysilicon layer 35.

The polysilicon layer 35 is connected to a line 37 for supplying a signal. The insulating layer 36 and the gate insulating layer 21 of Embodiment 2 are simultaneously formed as the same layer.

With this structure, the capacitors 32 of two adjacent pixels 1 aligned in a horizontal direction share one diffusion layer 33 as one terminal s(n$^-$) of each capacitor 32. Thus, a s shown in FIG. 10, if the capacitors 32 of the adjacent pixels 1 are arranged close to each other to share the diffusion layer 33 as one terminal (n$^-$), it is possible to lay out the diffusion layer 33 on a straight line perpendicular to the negative, power source line 9. Consequently, the potential of the diffusion layer 33 is stably kept uniform even when the area of the panel is increased.

Figure 12:
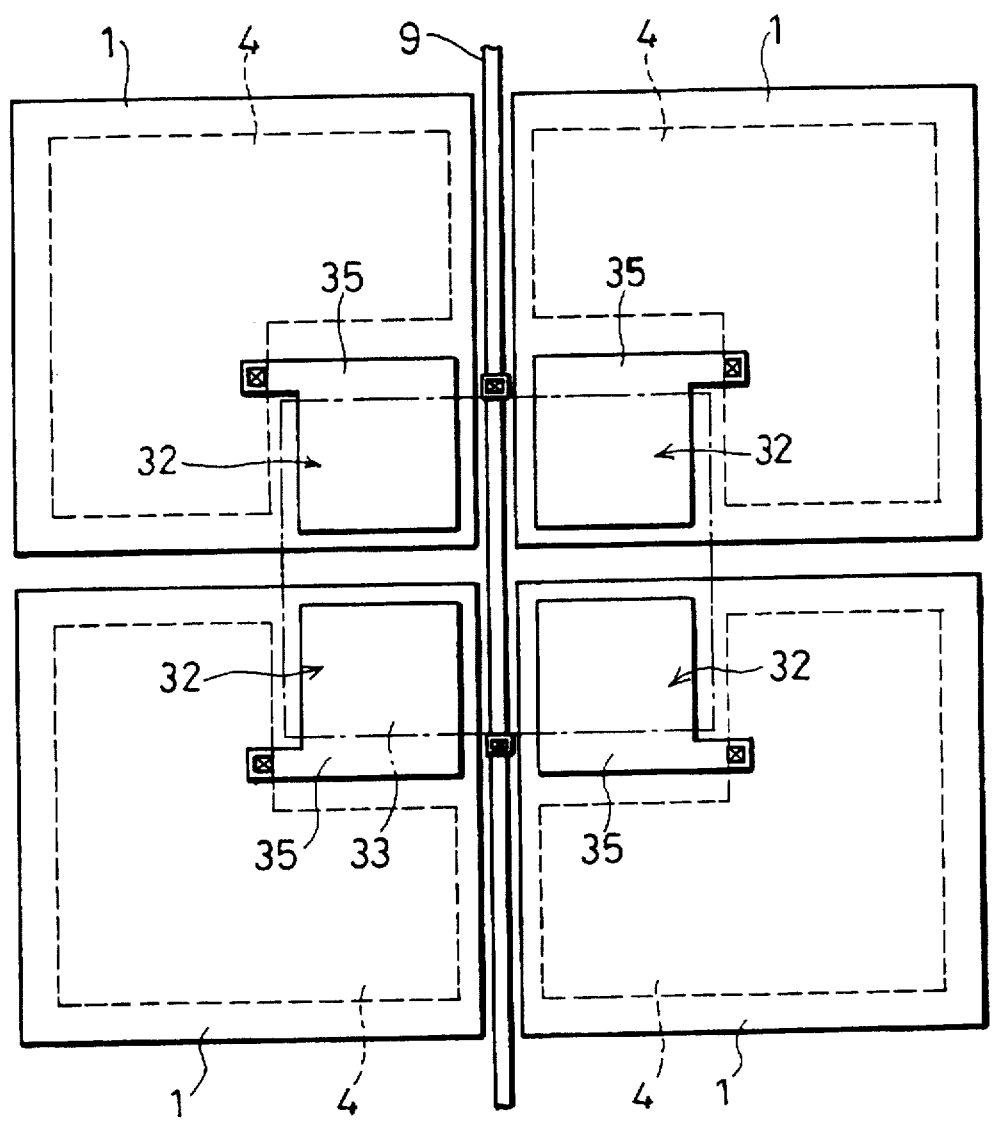
FIG. 12 is a schematic plan view of an N$^-$ diffusion layer shared by the pixels.

In FIG. 10, overlapping sections of the capacitors 32 and common sections of the diffusion layer 33 are formed by the same member. However, needless to say, as illustrated in FIG. 12, it is possible to share only the diffusion layer 33 by the four pixels 1. The same can also be said to the p-channel transistors in Embodiment 2.

In this embodiment, a driving circuit 4 including four transistors and two capacitors forms a sample-and-hold circuit. However, the driving circuit 4 is not necessarily limited to this structure, and it may have another structure.

As to the overlapping structure of the driving circuits 4 in adjacent pixels 1, overlapping is not necessarily arranged within four adjacent pixels 1, located upper and lower positions and right and left positions. It is also not necessarily to limit the number and shape of the driving circuits 4.

Figure 13:
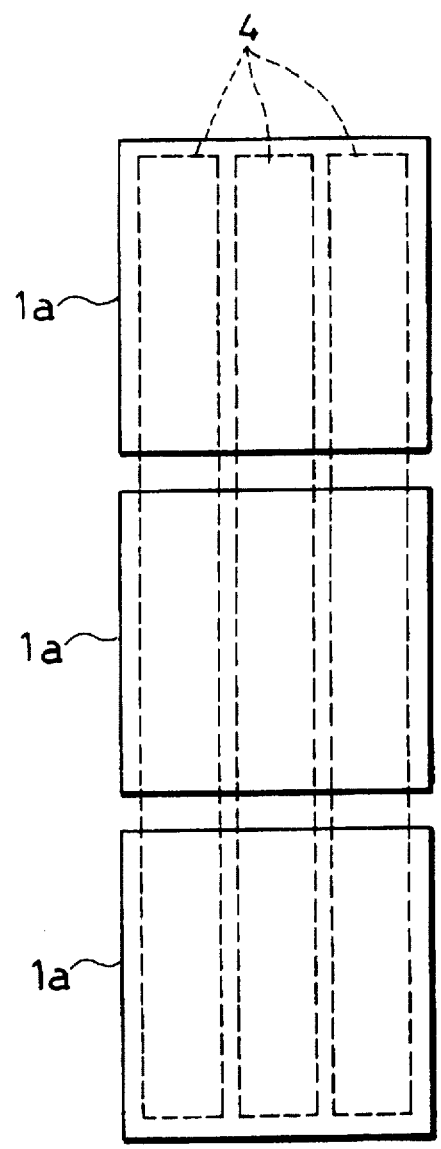
FIG. 13 is a schematic plan view showing driving circuits shared by the pixels.
Figure 14:
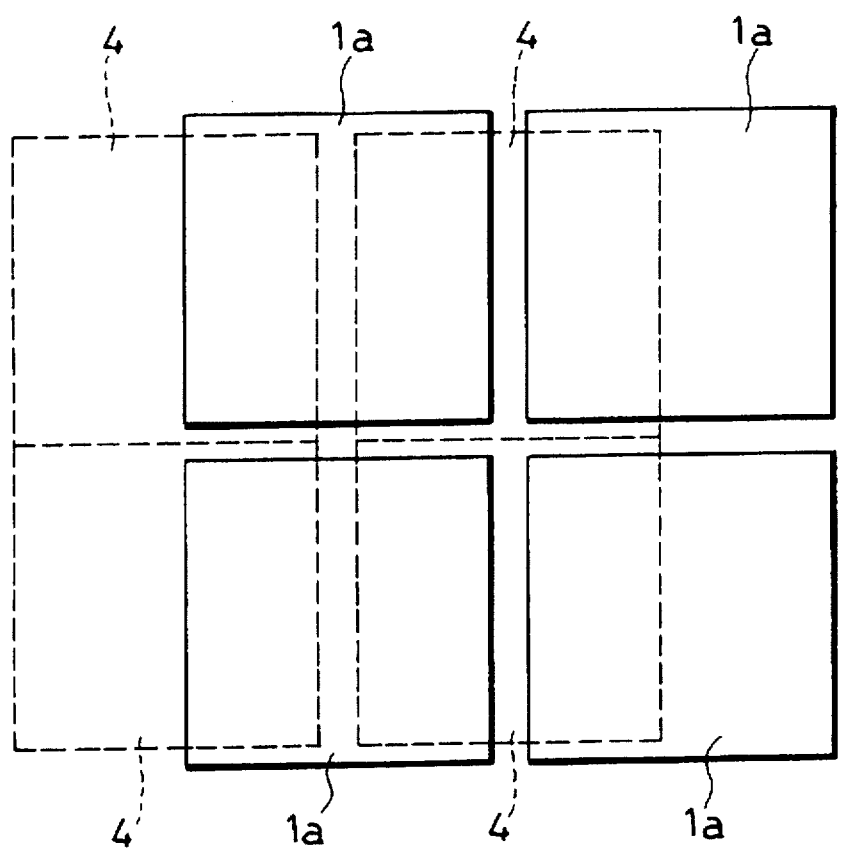
FIG. 14 is a schematic plan view showing another examples of the driving circuits shared by the pixels.
Figure 15:
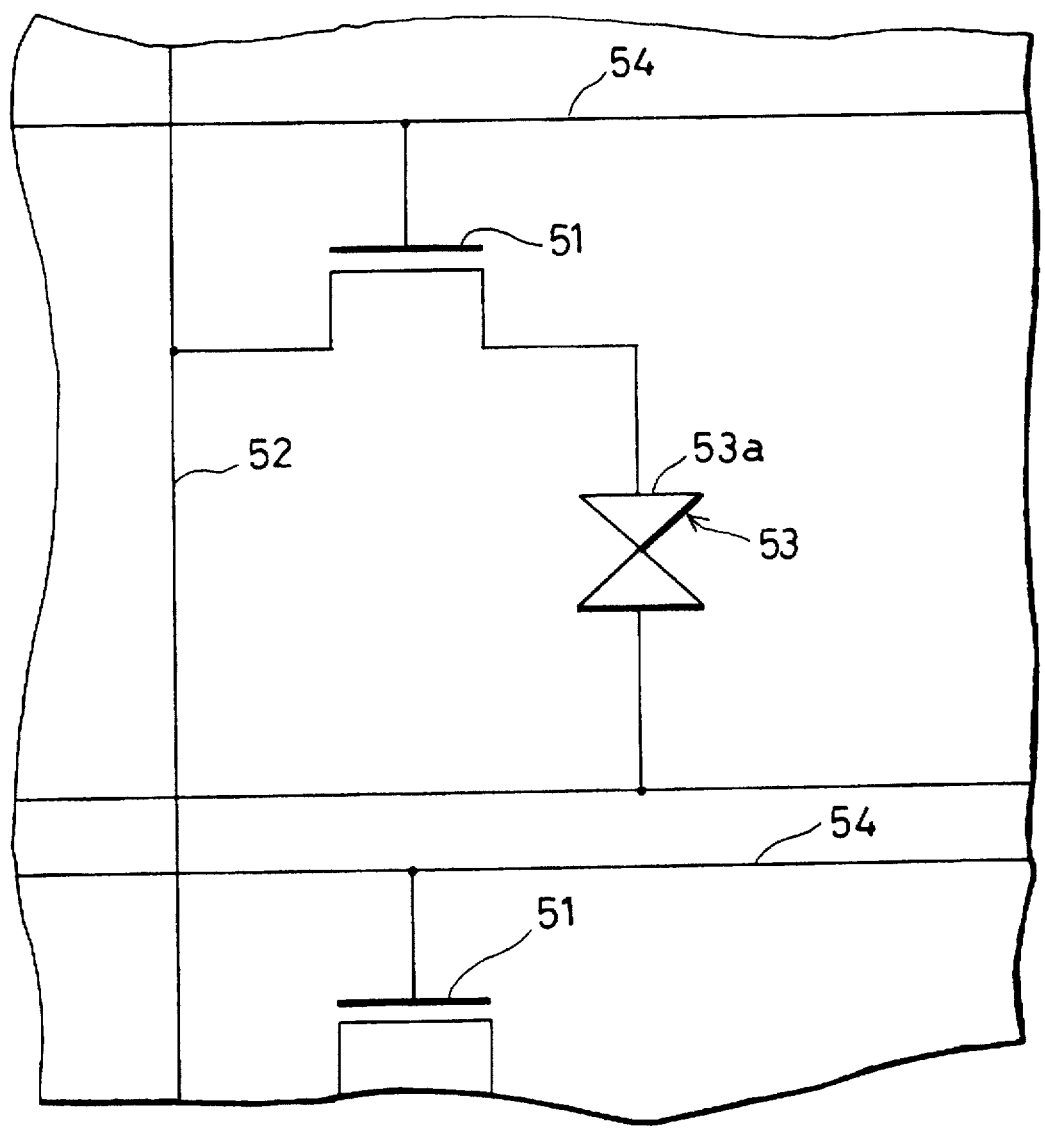
FIG. 15 is an equivalent circuit diagram showing circuit elements for driving conventional pixels.
Figure 16:
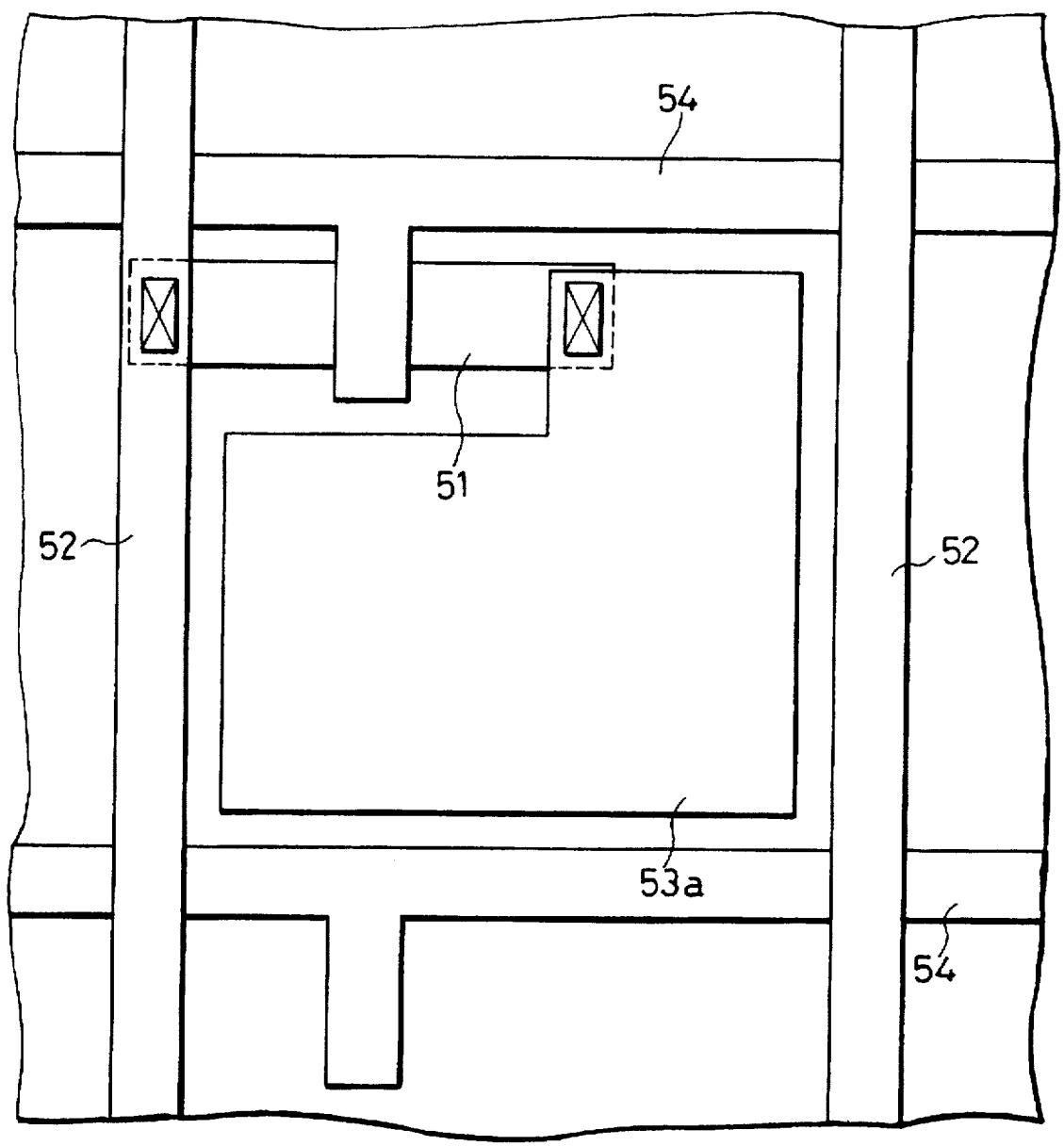
FIG. 16 is a schematic plan view of the circuit elements.
Figure 17:
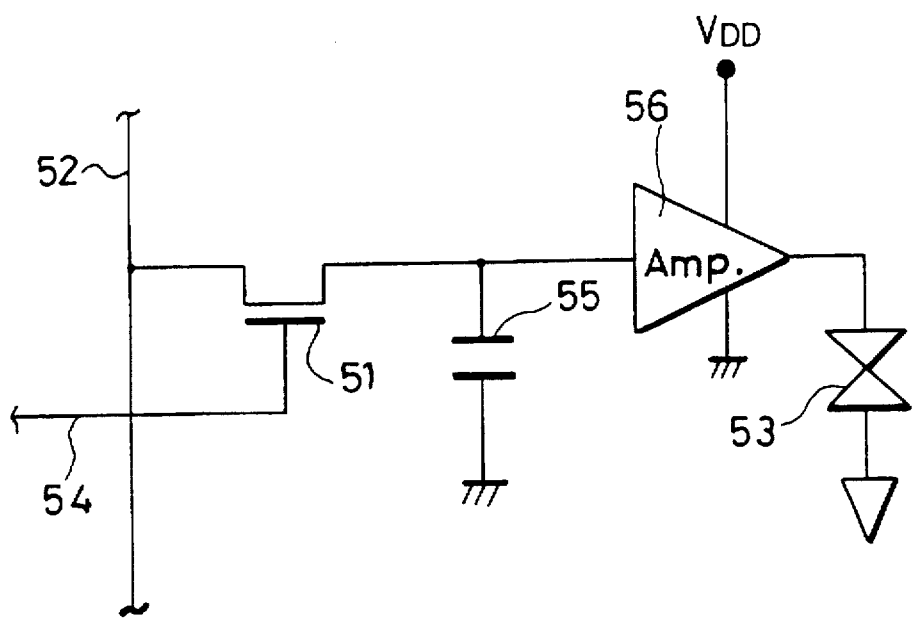
FIG. 17 is a view showing another circuit elements for driving the conventional pixels.
Figure 18:
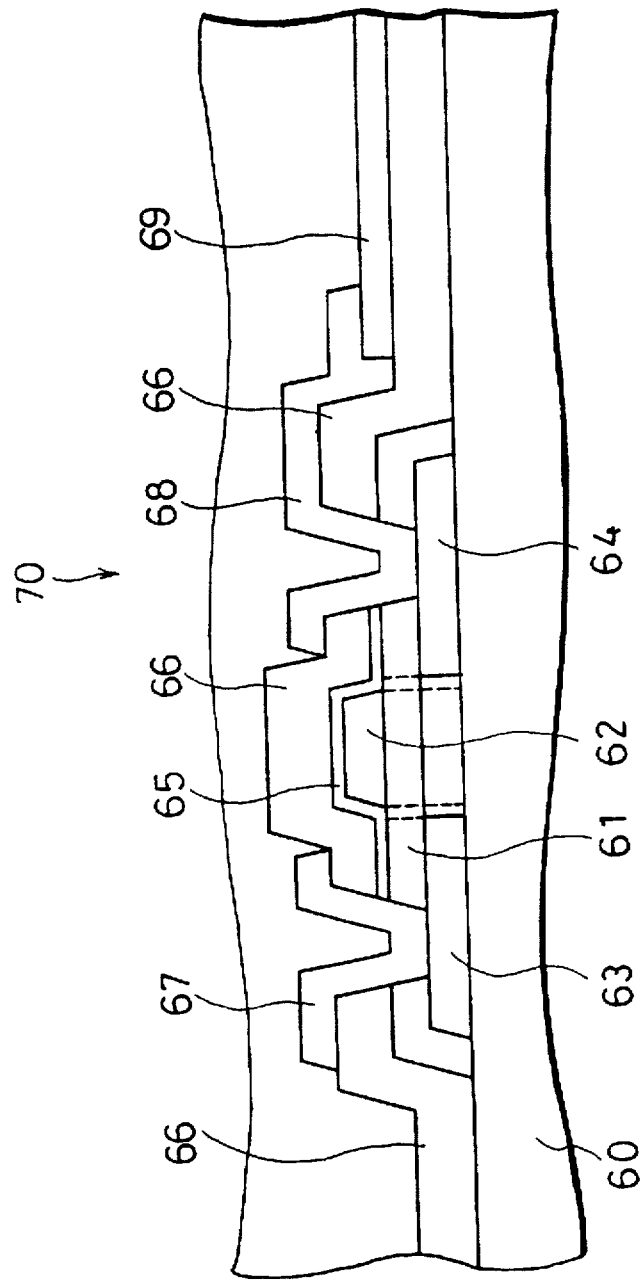
FIG. 18 is a schematic view showing the structure of a transistor as a circuit element.

It is therefore possible to arrange more than one adjacent driving circuits 4 aligned in a horizontal or vertical direction to overlap the adjacent pixels 1. For example, as shown in FIG. 13, the pixel electrodes 1a aligned in a vertical direction is divided into three in the vertical direction by arranging three driving circuits 4 aligned in a horizontal direction to overlap the three pixel electrodes 1a. FIG. 14 illustrates another example in which the driving circuit 4 overlaps the lower surface of the adjacent pixel electrodes 1a by shifting the positions of the driving circuits 4 and the adjacent pixel electrodes 1a in parallel.

As clear from the above explanation, in the image display device of the present invention, even if the pixels are arranged to be driven using a plurality of circuit elements, for example, p-channel transistors and n-channel transistors, it is possible to restrain an increase in the area of pixel and improve the quality of the image displayed by the pixels.

Moreover, with the structure of the present invention, it is possible to restrain the deterioration of the displayed image due to the influence of the leakage electric field between the circuit elements and the wiring thereof and the pixels, and the leakage current of the circuit elements caused by external light, thereby achieving a reflective image display device capable of displaying bright and high-quality images.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image display device comprising:

a number of pixels for displaying an image; and first and second type circuit elements for driving each pixel, wherein said pixels are arranged in a two-dimensional matrix on a substrate, said circuit elements are monolithically formed on said substrate, said circuit elements in adjacent pixels are positioned close to each other in peripheral sections of said pixels, and the first type circuit element corresponding to each pixel overlaps an adjacent pixel in a border region including the peripheral sections of adjacent pixels.

2. The image display device according to claim 1, wherein said first and second type circuit elements are arranged substantially symmetrically with respect to a line between said pixels perpendicular to the border region.

3. The image display device according to claim 1, wherein at least portions of said first and second type circuit elements are arranged substantially symmetrically with respect to a point on a line between said pixels perpendicular to the border region.

4. The image display device according to claim 1, further comprising:

a positive power source line, and a negative power source line, wherein said circuit elements for each pixel include at least one p-channel transistor and one n-channel transistor, wherein the negative power source line is provided along a line between said pixels perpendicular to the border region, and wherein adjacent pixels share the negative power supply wiring.

5. The image display device according to claim 1, wherein one electrode of plural electrodes in each of said pixels for displaying an image is a reflective electrode with a light reflecting property, and said circuit elements are disposed on a back surface of said reflective electrode through an insulating layer so that at least a part of said circuit elements overlaps an area of said adjacent pixel.

6. The image display device according to claim 1, wherein said image display device is a reflection type image display device.

7. The image display device according to claim 1, wherein said substrate is formed of a semiconducting material having a first polarity and includes a diffusion layer having a second polarity opposite the first polarity, said diffusion layer being formed in the border region, each of said circuit elements includes a p-channel transistor and an n-channel transistor for driving said pixel, and said transistors located adjacent to each other use a common diffusion layer.

8. The image display device according to claim 7, wherein said diffusion layer overlaps an area of the adjacent pixel.

9. The image display device according to claim 1, wherein each of said circuit elements includes a transistor for driving said pixel, and said transistors located adjacent to each other include a common anodic oxide film.

10. The image display device according to claim 9, wherein said transistor is formed with polycrystalline silicon.

11. The image display device according to claim 9, wherein said anodic oxide film overlaps an area of the adjacent pixel.

12. The image display device according to claim 1, wherein each of said circuit elements includes a capacitor, and wherein said capacitors located adjacent to each other have an common electrode.

13. The image display device according to claim 12, wherein said substrate is formed with a semiconducting material, and said common electrode of said capacitors is a diffusion layer.

14. The image display device according to claim 13, wherein said diffusion layer overlaps an area of the adjacent pixel.

15. The image display device of claim 1, wherein the first type circuit elements of adjacent pixels are arranged in a line in the border region.

16. The image display device of claim 1, wherein the substrate is a semiconductor having a first polarity, the substrate further including a diffusion layer having a second polarity opposite the first polarity formed in the semiconductor substrate and in the border region, and wherein the circuit elements include p-channel transistors, n-channel transistors, and capacitors.

17. An image display device comprising:

a number of pixels for displaying an image; and first and second type circuit elements for driving each pixel, wherein said pixels are arranged in a two-dimensional matrix on a substrate, said circuit elements are monolithically formed on said substrate, said circuit elements in adjacent pixels are positioned close to each other in peripheral sections of said pixels, and wherein one electrode of plural electrodes in each of said pixels for displaying an image is a reflective electrode with a light reflecting property, and said circuit elements are disposed on a back surface of said reflective electrode through an insulating layer so that at least a part of said circuit elements overlaps an area of said adjacent pixel;

a first line formed of a first conducting material for driving said circuit elements;

a shield electrode formed of a second conducting material;

reflective electrodes formed of a third conducting material;

a first insulating layer for separating said circuit elements and said shield electrode; and a second insulating layer for separating said shield electrode and said reflective electrodes, wherein said first line, said shield electrode, and said reflective electrodes are laminated in this order on said substrate from a back surface toward a front surface, and said shield electrode covers said circuit elements and said first line through said first insulating layer, is connected to said first line, and covers said reflective electrodes and portions between said reflective electrodes through said second insulating layer.

18. The image display device according to claim 17, wherein a dielectric constant of said first insulating layer is smaller than a dielectric constant of said second insulating layer.

19. The image display device according to claim 17, wherein a thickness of said first insulating layer is larger than a thickness of said second insulating layer.

20. The image display device according to claim 17, further comprising a second wiring layer for driving said circuit elements, wherein said second wiring layer is formed of said second conducting material on said substrate, and said second wiring layer and said shield electrode are formed as one layer on said substrate.

* * * * *